US007770163B2

(12) United States Patent
Stoodley et al.

(10) Patent No.: US 7,770,163 B2
(45) Date of Patent: Aug. 3, 2010

(54) METHOD OF EFFICIENTLY PERFORMING PRECISE PROFILING IN A MULTI-THREADED DYNAMIC COMPILATION ENVIRONMENT

(75) Inventors: Kevin Alexander Stoodley, Richmond Hill (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 1167 days.

(21) Appl. No.: 11/388,607

(22) Filed: Mar. 24, 2006

(65) Prior Publication Data

US 2007/0226683 A1 Sep. 27, 2007

(51) Int. Cl.
G06F 9/44 (2006.01)
G06F 9/45 (2006.01)
(52) U.S. Cl. ...................... 717/158; 717/130
(58) Field of Classification Search .................. 717/130
See application file for complete search history.

(56) References Cited

U.S. PATENT DOCUMENTS

2004/0103401 A1* 5/2004 Chilimbi et al. ............ 717/130
2004/0158589 A1* 8/2004 Liang et al. ................ 707/206
2005/0091645 A1* 4/2005 Chilimbi et al. ............ 717/130

OTHER PUBLICATIONS

Grattan et al., "Windows CE 3.0: Application Programming", Oct. 20, 2000, Prentice Hall, Chapter 6, pp. 165-168.*
John Torjo, "From compile-time constants to runtime constants and back", Oct. 29, 2003.*
Hirzel et al., "Bursty Tracing: A Framework for Low-Overhead Temporal Profiling", 2001, 117-126.*
Arnold et al., "A Framework for Reducing the Cost of Instrumented Code", PLDI 2001, Snowbird Utah, ACM 2001, pp. 1-12.

* cited by examiner

Primary Examiner—Wei Y Zhen
Assistant Examiner—Lanny Ung
(74) Attorney, Agent, or Firm—Yee & Associates, P.C.; Libby Z. Toub

(57) ABSTRACT

Synchronizing clones of a software method to be executed by at least one thread while the software method is compiled. The software method is cloned to generate a software method clone. At least one transition is created between equivalent program points in the software method and the software method clone. A lock object is inserted into one of the software method and the software method clone. Then, code that controls the at least one transition between a profiling clone and a non-profiling clone is changed to access thread-local storage. The non-profiling clone is the one of the software method and the software method clone into which the lock object was inserted. A first synchronization operation is performed at or after an entry point of the non-profiling clone. Then, the profiling clone is executed using thread-local storage.

29 Claims, 7 Drawing Sheets

FIG. 8

| | Non-profiling clone | Profiling clone |
|---|---|---|
| 1 | Non-profiling clone | Profiling clone |
| 2 | ...code in user program... | ...code in user program... |
| | | goto non-profiling-label2; |
| 3 | if(global_profiling_count>0) | profiling-label1; |
| 4 | goto non-profiling-label1; | global_profiling_frequency=FREQ; |
| 5 | else | global_profiling_count--; |
| 6 | { | if(global_profiling_count>0) |
| 7 | global_profiling_count=COUNT; | goto profiling label2; |
| 8 | global_profiling_frequency=FREQ; | else |
| 9 | } | global_profiling_frequency=MAX_INT; |
| 10 | non-profiling label1: | profiling label2: |
| 11 | global_profiling_frequency--; | ...code in user program... |
| 12 | if(global_profiling_frequency>0) | |
| 13 | goto non-profiling-label2; | |
| 14 | else | |
| 15 | goto profiling-label1; | |
| 16 | non-profiling label2: | |
| 17 | ...code in user program... | |

```
1   Lock(method_profiling_lock)
2     local_profiling_count=global_profiling_count;
3     local_initial_profiling_count=global_profiling_count;
4     local_profiling_frequency=global_profiling_frequency;
5   Unlock(method_profiling_lock)

6   for(each basic block b in the method)
7     local_block_frequency[b]=0;
```

FIG. 9

```
1   Lock(method_profiling_lock)
2     local_profiling_count=global_profiling_count-(local_initial_profiling_count-
3   local_profiling_count);
4     for(each basic block b in the method)
5       global_block_frequency[b]=global_block_frequency[b]+local_block_frequency[b];

6     if(local_profiling_count>0)
7       global_profiling_frequency=global_profiling_frequency-local_profiling_frequency
8   modulo FREQ;
9     else
10      global_profiling_frequency=MAX_INT;
11  Unlock(method_profiling_lock)
```

| EXPERIMENTAL RESULTS | | | |
|---|---|---|---|
| INCREASE IN SPACE REQUIRED: | | | |
| BENCHMARKS | BASE | PROFILING COUNT AND FREQUENCY ONLY | |
| | NUMSLOTS | NUMSLOTS | INCREASE |
| _201_compress | 81 | 87 | 7.4 |
| _202_jess | 100 | 105 | 5.0 |
| _209_db | 50 | 58 | 16.0 |
| _213_javac | 258 | 293 | 13.5 |
| _222_mpegaudio | 111 | 121 | 9.0 |
| _227_mtrt | 99 | 112 | 13.1 |
| _228_jack | 148 | 211 | 42.5 |
| SPECjbb2000 | 183 | 203 | 10.9 |
| AVERAGE | | | 14.7 |

| BENCHMARKS | BASE | ALL GLOBAL VARIABLES | |
|---|---|---|---|
| | NUMSLOTS | NUMSLOTS | INCREASE |
| _201_compress | 81 | 348 | 329.7 |
| _202_jess | 100 | 832 | 732.0 |
| _209_db | 50 | 260 | 420.0 |
| _213_javac | 258 | 2462 | 854.2 |
| _222_mpegaudio | 111 | 311 | 180.2 |
| _227_mtrt | 99 | 763 | 670.7 |
| _228_jack | 148 | 1462 | 887.8 |
| SPECjbb2000 | 183 | 954 | 421.3 |
| AVERAGE | | | 562.0 |

METHOD OF EFFICIENTLY PERFORMING PRECISE PROFILING IN A MULTI-THREADED DYNAMIC COMPILATION ENVIRONMENT

BACKGROUND OF THE INVENTION

1. Field of the Invention

The present invention relates generally to an improved data processing system and in particular to the efficient compilation of computer usable program code. Still more particularly, the present invention relates to performing precise profiling techniques in a multi-threaded dynamic compilation environment.

2. Description of the Related Art

Compilers are software programs that modify a second program. For example, a compiler can transform a computer program written in a language more easily understandable to humans into a language more easily used by a computer. In this example, a compiler is said to compile source code into executable code.

However, compilers have a wide variety of applications in modifying programs. In another example, optimizing compilers can be used to optimize existing code, whether or not that existing code is source code or executable code. For example, an optimizing compiler can profile existing code to identify and, optionally, automatically change, existing portions of inefficient code so that the existing code operates more efficiently or more quickly.

Additionally, some modern compilers can operate on a program while it is being executed. This type of compiler is referred to as a dynamic compiler, and computer programming languages that are designed to support such activity may be referred to as "dynamically compiled languages".

Some modern compilers also use a technique known as profiling to improve the quality of code generated by the compiler. An example of a profiling technique is profile directed feedback (PDF). Profiling is usually performed by adding relevant instrumentation code to the program being compiled, and then executing that program to collect profiling data. Examples of profiling data include relative frequency of execution of one part of the program compared to others, values of expressions used in the program, and outcomes of conditional branches in the program. The optimizing compiler can use this data to perform code reordering, based on relative block execution frequencies, code specialization, based on value profiling, code block outlining, or other forms of optimization techniques that boost the final program's performance.

However, advances in computer technology have affected profiling techniques in optimizing compilers. Some modern computers are capable of supporting a technology known as multi-threading. In programming, a thread is a part of a program that can execute independently of other parts of the program. Operating systems that support multi-threading enable programmers to design programs whose threaded parts can execute concurrently. Sometimes, a portion of a program being concurrently executed is also referred to as a thread, as can the portion of the data processing system's resources dedicated to controlling the execution of that portion of the program.

In data processing systems that operate multiple threads of a program, current optimizing compilers are unable to synchronize multiple threads efficiently when the multiple threads manipulate global data. The problem arises because of tradeoff between resource cost and accuracy. Purely static profiling systems have found generating fully thread-safe code to be too costly, and thus have reduced accuracy and the inability to gather either thread-specific or invocation-specific data to drive their optimization decisions. In dynamic compilation, where profiling resource costs must be paid at runtime, the stakes are even higher. The stakes are higher because of the presence of globally visible profiling control variables that are used to limit the cost of dynamic profiling and because of the need to eliminate race conditions to avoid becoming stuck in profiling mode. For this reason, devices and methods are desired whereby goals in limiting profiling cost can be met while still providing accurate profiling data and the ability to gather both thread-specific and invocation-specific profile data. Thus, advances in computer technology have required advances in profiling techniques for optimizing compilers.

SUMMARY OF THE INVENTION

The aspects of the present invention provide for a computer implemented method, apparatus, and computer usable program code for synchronizing a plurality of clones of a software method to be executed by at least one thread while the software method is compiled. An exemplary method includes cloning the software method to be compiled to generate a first software method clone. At least one transition is created between equivalent program points in the software method and the first software method clone. A lock object is inserted into one of the software method and the first software method clone. Code that controls the at least one transition between a profiling clone and a non-profiling clone is changed to access thread-local storage. The non-profiling clone comprises the one of the software method and the first software method clone into which the lock object was inserted, and the profiling clone comprises the other one of the software method and the software method clone. A first synchronization operation is performed at one of an entry point of the non-profiling clone and a point after the entry point of the non-profiling clone so as to initialize the thread-local storage prior to using the thread-local storage. The profiling clone is executed using thread-local storage.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

FIG. 8 is pseudo-code for which profiling in a multi-threaded dynamic compilation environment can be performed, in accordance with an illustrative example of the present invention;

FIG. 9 is pseudo-code representing a lock object inserted at an entry point in a software method, in accordance with an illustrative example of the present invention;

FIG. 10 is pseudo-code representing a lock object inserted at an exit point in a software method, in accordance with an illustrative example of the present invention;

FIG. 11 is a table showing experimental results on the effect that efficient multi-threaded dynamic compilation techniques have on memory requirements and compilation speed.

DETAILED DESCRIPTION OF THE PREFERRED EMBODIMENT

Figure 1:
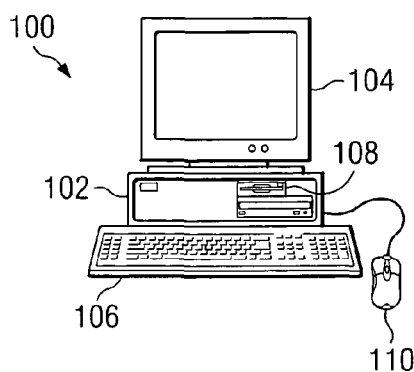
FIG. 1 is a pictorial representation of a data processing system in which the aspects of the present invention may be implemented.

With reference now to the figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
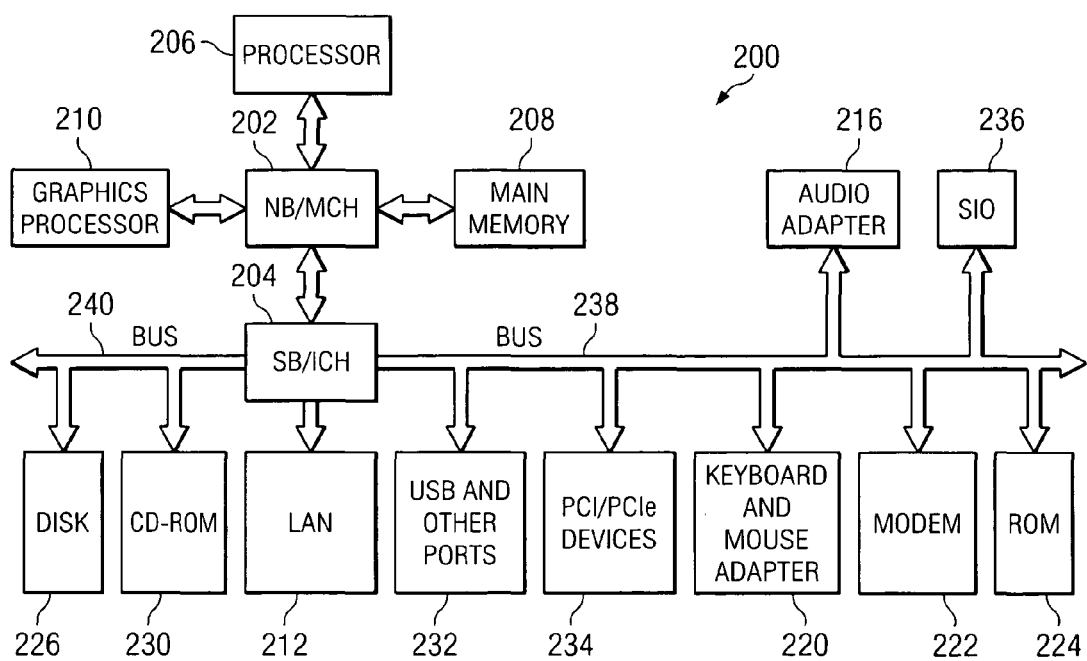
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for compiling source code. The methods of the present invention may be performed in a data processing system, such as data processing system 100 shown in FIG. 1 or data processing system 200 shown in FIG. 2.

As used herein, the following terms have the following meanings:

A "compiler" is a computer program that translates a series of statements written in a first computer language into a second computer language, or somehow modifies the code of a computer program. A "compiler" can also be an "optimizing compiler."

An "optimizing compiler" is a computer program that modifies program code in order to cause the program to execute more efficiently. An optimizing compiler need not change the language in which a program is written. It will be appreciated by one skilled in the art that the word "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

"Dynamic compilation" means compiling a program while the program is executing.

An "entry point" is a section of code which is first executed when the method containing the code is executed. An "entry point" can also be described as the prologue of a software method. An "entry point" is the code first executed when a software method is called and is responsible for tasks related to preparing to execute the body of the software method.

An "exit point" is a section of code which is last executed when the software method containing the code has executed. An "exit point" can also be described as the epilogue of a method. An "exit point" is code responsible for cleaning up a temporary state before returning to the call point after the software method has finished executing.

The term "execution path" refers to a control flow path in a program that starts from an entry point or a loop back edge and ends at an exit point or loop back edge.

"Global data" is data that is visible and addressable by any thread in the program. Care must be taken to avoid unpredictable results when multiple threads may access the same global data simultaneously. Thus, race conditions can arise with respect to global data.

A "global profiling control variable" is a reference to global data that is used to control how frequently profiling code will be executed and for how long profiling will be performed. A "global profiling control variable" can also be characterized as a globally visible variable that is used to decide whether, for how long, or how often to collect profile data. A "global profiling control variable" is used to set bounds on how much of a system's resources are to be devoted to gathering profiling data versus how much of the system's resources are to be devoted to executing the program.

A "global profiling data variable" is a reference to global data that is used to store the information collected while profiling is being performed. An example of a global profiling data variable would be the global data used to store the number of times a certain code fragment executes. A "global profiling data variable" can also be characterized by a globally visible data area which is used to hold profiling data being collected during program execution. An example of a "global profiling data variable" would be the number of times a particular area of code has been executed.

The term "initialize" means to store an "initial" value into a variable, where the "initial" value could vary depending on the variable. The term "initialize" can also mean "to set the first value of some aspect of data processing system." For example, before being initialized, memory does not have a predictable or known value.

A "lock object" is an object used to perform a synchronization operation as a result of which some storage within the object is updated to reflect the fact that a specific thread has succeeded in a synchronization operation. A "lock object" can also be characterized as an object that is used to control access to a defined area of memory.

An "object" is a region of storage that contains a value or group of values. Each value can be accessed using its identifier or a more complex expression that refers to the object. Each object has a unique data type. The data type of an object determines the storage allocation for that object. An example is a dynamic array or a static array of dynamic arrays.

"Profiling instrumentation" is computer usable program code which is inserted into another program. The profiling instrumentation is designed to generate profiling data for the program while the program is executing.

A race condition is a situation in which two or more threads attempt to simultaneously access global data and update the value in a manner that would result in an outcome that would be different than an outcome in which the thread had accessed and updated the global data in a sequential manner. A race condition can also be characterized as unpredictable behavior that may result when two or more threads access global data in quick succession, such that inconsistent or unpredictable results are left in the global data.

A "software method" is a set of instructions designed to perform a function or take an action in a data processing system. Thus, a "software method" can be a function, procedure, or subroutine.

A "thread" is a part of a program that can execute independently of other parts of the program. Operating systems that support multi-threading enable programmers to design programs whose threaded parts can execute concurrently. Sometimes, a portion of a program being concurrently executed is also referred to as a thread, as can the portion of the data processing system's resources dedicated to controlling the execution of that portion of the program.

A "thread-specific local profiling control variable" is a reference to data accessed by only one thread that is used to control how frequently profiling code will be executed and for how long profiling will be performed by that thread when it is executing code. A "thread-specific local profiling control variable" is similar to a "global profiling control variable," except that the "thread-specific local profiling control variable" is only used (and possibly only addressable) by a single thread.

A "thread-specific local profiling data variable" is a reference to data accessed by only one thread that is used to store the information collected when profiling is being performed by that thread when it is executing code. A "thread-specific local profiling data variable" is similar to a "global profiling data variable," except that the "thread-specific local profiling data variable" is only used (and possibly only addressable) by a single thread.

As described further below with respect to FIG. 4, the aspects of the present invention recognize that performing profiling with an optimizing compiler in a multi-threaded environment can result in a final code that could have errors or that does not include all available optimizations. In an illustrative example, described with respect to FIG. 6 through FIG. 10, a solution to this problem involves inserting synchronization operations to access and update global variables. A lock object is allocated for each software method present, and each thread synchronizes on this lock object. Thus, the lock objects ensure that manipulation of global data structures in a particular software method is performed by only one thread that has successfully acquired the lock at any point in the software method. The use of lock objects in this manner avoids race conditions and avoids problems associated with using profiling techniques in an optimizing compiler in a multi-threaded environment.

In order to avoid unduly impacting scalability as a result of the synchronization operations, code can be generated and placed during optimization such that exactly two synchronization operations are performed in each invocation of a method. However, additional synchronization operations can be performed.

The first synchronization operation is performed on the entry point of a method. In this locked region of code, the value of the profiling frequency and profiling count is read and stored in thread-local storage. During execution of the software method being profiled, the thread-local storage can be read and updated without any synchronization by each thread. The code that controls the transitions between the profiling and non-profiling clones is changed to access the thread-local storage corresponding to the profiling count and profiling frequency instead of the global variables. Similarly, the thread-local counters for block frequencies for each block are incremented. Because there are no race conditions, the relative block frequencies are consistent and precise.

The second synchronization operation is inserted at each exit point of each software method. The locked regions at exit points read the values in the thread-local storage and update the respective global variable that should be updated. Once the profiling data structures have been synchronized, the original behavior of the software method is restored.

Figure 3:
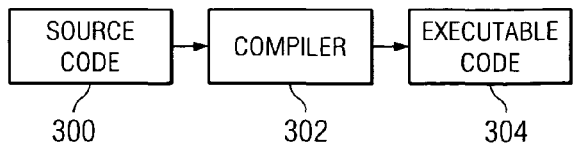
FIG. 3 is a block diagram of a prior art compiler, in which the present invention may be implemented.

FIG. 3 is a block diagram of a known compiler. Source code 300 is created by one or more of a number of known techniques, such as automatically, or by a human programmer. Compiler 302 and executable code 304 are computer usable programs that can be used in a data processing system, such as data processing system 100 in FIG. 1 or data processing system 200 in FIG. 2.

Source code 300 defines how a program will eventually operate, but source code 300 is usually not in a desired format for execution on a data processing system. Instead, source code 300 is often in a format that is easier for a human to interpret. After source code 300 has been defined, source code 300 is provided to compiler 302. A typical compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user. When this process is complex, a build utility is often used. Note that because the entry point in general only reads from global state, then known techniques to allow multiple simultaneous readers could be used as an enhancement.

Most compilers translate a source code text file, written in a high level language, to object code or machine language, e.g. into an executable .EXE or .COM file that may run on a computer or a virtual machine. However, translation from a low level language to a high level one is also possible. Such a compiler is normally known as a decompiler if the compiler is reconstructing a high level language program which could have generated the low level language program. Compilers also exist which translate from one high level language to another, or sometimes to an intermediate language that still needs further processing. These latter types of compilers are known as transcompilers, or sometimes as cascaders.

Another type of compiler is an optimizing compiler. The operation of an optimizing compiler is described with respect to FIG. 4.

Figure 4:
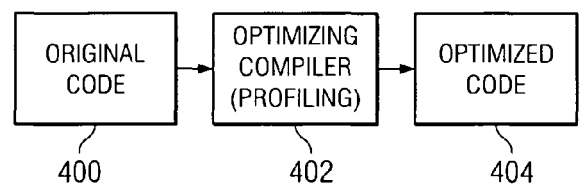
FIG. 4 is a block diagram of an optimizing compiler, in accordance with an illustrative example of the present invention.

FIG. 4 is a block diagram of an optimizing compiler, in accordance with an illustrative embodiment of the present invention. Original code 400 is created by one or more of a number of known techniques, such as automatically, or by a human programmer. Original code 400 typically is executable code. Optimizing compiler 402 is, itself, a computer usable program that can be used in a data processing system, such as data processing system 100 in FIG. 1 or data processing system 200 in FIG. 2.

Original code 400 defines how a program operates, but original code 400 may not perform optimally in terms of the time needed to execute original code 400 or the computer resources used to execute original code 400. Thus, original code 400 is provided to optimizing compiler 402, which is adapted to optimize original code 400.

Much like compiler 302 in FIG. 3, optimizing compiler 402 is a computer program that translates a series of statements written in a first computer language, such as original code 400, into a second computer language, such as optimized code 404. Optimizing compiler 402 can also modify original code 402 to form optimized code 404 without changing the language used to implement original code 400.

Thus, optimizing compiler 402 is, itself, a computer program designed to convert original code 400 into optimized code 404. After optimizing compiler 402 has performed its programmed actions on original code 400, optimizing compiler 402 outputs optimized code 404. Optimized code 404 is in a desired computer-usable format and is ready for use in a data processing system.

Optimizing compilers, such as optimizing compiler 402, can use a number of different techniques to convert original code 400 to optimized code 404. An example of a known optimizing method is called profiling. An example of a profiling technique is profile directed feedback (PDF). Profiling is usually performed by adding relevant instrumentation code to the program being compiled, and then executing that program to collect profiling data. Examples of profiling data include relative frequency of execution of one part of the program compared to others, values of expressions used in the program, and outcomes of conditional branches in the program. The optimizing compiler can use this data to perform code reordering, based on relative block execution frequencies, code specialization, based on value profiling, code block outlining, or other forms of optimization techniques that boost the final program's performance.

Both static and dynamic optimizing compilers benefit from profiling by performing similar optimizations; however, a dynamic optimizing compiler should be able to collect profiling data without significantly degrading overall performance of the original code. Dynamic optimizing compilers should have this capability because dynamic optimizing compilers operate on the original code while the original code is executing. In other words, because a dynamic optimizing compiler should perform profiling while the original code is executing, the profiling technique should be efficient in terms of the profiling technique's impact on the operation of the original code, in terms of overall computer overhead used, and in terms of the overall execution time of the entire process. Thus, efficient techniques for performing efficient profiling in a dynamic compilation environment are desirable.

Several methods for performing efficient profiling exist. One exemplary method of performing efficient profiling in a dynamic compilation environment is shown with respect to FIG. 5.

Optimizing compiler 402 can operate in a multi-threaded environment in which one or more processors implement a software method simultaneously along multiple threads. Optimizing compiler 402 acts on the software method while the software method is executing. Optimizing compiler 402 inserts lock objects for each clone of the software method in order to perform synchronization operations. In a multi-thread environment, each thread will synchronize on the lock object to ensure that manipulation of global data structures for a corresponding software method is performed by only one thread—the thread that has successfully acquired the lock. This step thereby eliminates race conditions that may arise without the presence of the lock objects. This process is described in greater detail with respect to FIG. 6. Examples of lock objects are shown within FIG. 9 and FIG. 10.

Figure 5:
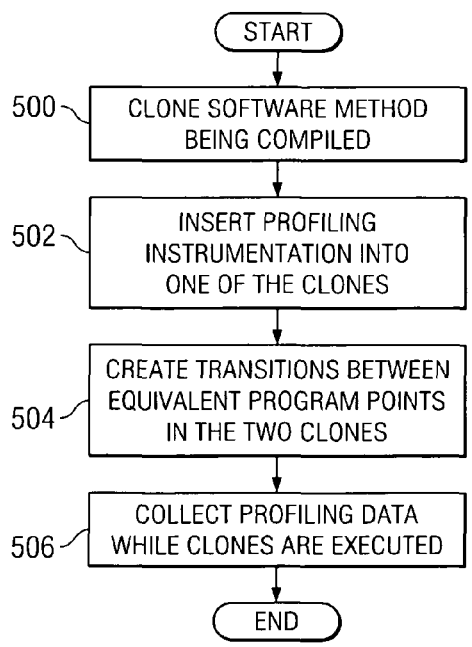
FIG. 5 is a flowchart illustrating profiling in a dynamic compilation environment, in accordance with an illustrative example of the present invention.

FIG. 5 is a flowchart illustrating profiling in a dynamic compilation environment, in accordance with an illustrative example of the present invention. The method shown in FIG. 5 is performed in an optimizing compiler, such as optimizing compiler 402 shown in FIG. 4. The method shown in FIG. 5 can be executed on a data processing system, such as data processing system 100 in FIG. 1 or data processing system 200 in FIG. 2. Exemplary pseudo-code demonstrating the method shown in FIG. 5 is shown in FIG. 8.

The process begins as the optimizing compiler clones a software method being compiled (step 500). A software method is a set of instructions designed to perform a function or take an action in a data processing system. The term "clone" in this context refers to creating an exact duplicate of the program being profiled. Next, the optimizing compiler inserts profiling instrumentation into one of the clones (step 502). Profiling instrumentation is computer usable program code which is inserted into another program. The profiling instrumentation is designed to generate profiling data for the program while the program is executing, such as profiling data described with respect to FIG. 3. Next, the optimizing compiler sets up transitions between equivalent program points in the two clones (step 504). The optimizing compiler sets up transitions such that the clone without profiling instrumentation executes most of the time.

Finally, the optimizing compiler collects profiling data while the two clones are executed (step 506). Occasionally, a code path runs through the clone with profiling instrumentation. When this event occurs, the optimizing compiler collects profiling data without significantly affecting the performance of the program being compiled. The process terminates thereafter.

This profiling technique for use in optimizing compilers operates efficiently when the data processing system and the program do not operate using multiple threads. As described above, a "thread" is a part of a program that can execute independently of other parts of the program. Operating systems that support multi-threading enable programmers to design programs whose threaded parts can execute concurrently. Sometimes, a portion of a program being concurrently executed is also referred to as a thread, as can the portion of the data processing system's resources dedicated to controlling the execution of that portion of the program.

In a multi-threaded environment, the data structures used to manage the transitions between the two clones are visible to all threads in the program because they are global. Therefore, the data structures are visible to all threads in the program. However, the profiling technique described with respect to FIG. 5 does not address the issue of synchronization between threads when the threads manipulate global data. Thus, while the technique described with respect to FIG. 5 would work well if only a single thread in the program existed or if the program had multiple threads on a data processing system with a single central processing unit, performing this technique in a multithreaded environment can result in race conditions. A race condition is a situation in which two or more threads attempt to simultaneously access global data and update the value in a manner that would result in an outcome that would be different than an outcome in which the thread had accessed and updated the global data in a sequential manner. Race conditions can result in the clone with profiling instrumentation being executed more often than intended by the software method. The likelihood of race conditions arising increases with the number of threads in the software method. As a result, runtime performance could be degraded.

Another problem that can arise in a multi-threaded environment is that recompilation of the cloned software methods may not occur for a long time. A long time is a time deemed undesirable by a user. This problem is described in more detail with respect to FIG. 8.

Another problem that can arise in a multi-threaded environment is poor scalability with increasing number of threads. If multiple threads are executing code in a software method, it is possible that when the value of execution frequency reaches zero (signaling a transition), multiple threads read the same value and all transition to the profiling code. See FIG. 8 for examples of profiling code and non-profiling code. Additionally, all threads could read the same value for the profiling count and then decrement that value. Thus, the guarantee offered by the profiling in a single-threaded environment that only one execution path in the profiling code will be executed for every M paths (where M is the profiling frequency) in non-profiling code is no longer valid. Instead, the number of times profiling code is executed is directly proportional to the number of threads in the software method. If the software method is heavily multi-threaded, then a significant detrimental effect on scalability can occur.

Another problem that can arise in a multi-threaded environment is imprecision in profiling block frequencies. Multiple threads might read the same value for the block frequency for a block, increment the block, and write the same value for the block. As a result, an imprecise picture develops of the relative "hotness" of the blocks. The term "hotness" refers to the frequency with which a block of code is executed.

Another problem can arise in a multi-threaded environment when block frequencies have to be normalized. Using the profiling count as an upper bound for the frequency of any block is not possible in a multi-threaded environment because the profiling count may not have been incremented high enough, while a particular frequency may have been incremented to a higher value.

Thus, methods and devices that allow an optimizing compiler to perform profiling in a multi-threaded dynamic compilation environment are desirable. Techniques for allowing an optimizing compiler to perform profiling in this type of environment are presented with respect to FIG. 6 through FIG. 11.

Figure 6:
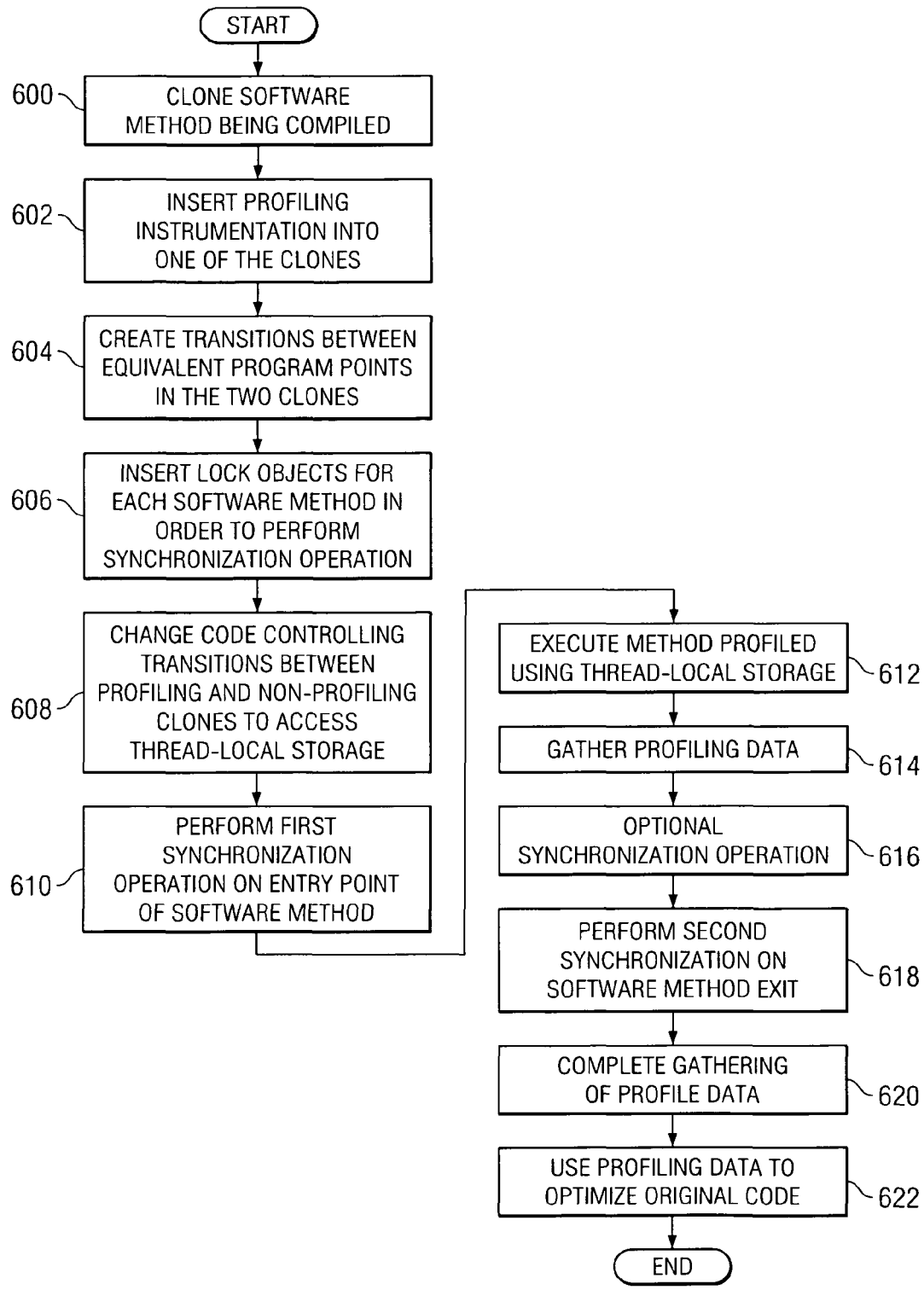
FIG. 6 is a flowchart illustrating optimizing compiling of a software method in a multi-threaded dynamic compilation environment, in accordance with an illustrative example of the present invention.

FIG. 6 is a flowchart illustrating optimizing compiling of a software method in a multi-threaded dynamic compilation environment, in accordance with an illustrative example of the present invention. The method shown in FIG. 6 is performed using an optimizing compiler, such as optimizing compiler 402 shown in FIG. 4. Furthermore, the method shown in FIG. 6 supplements and adds to the method shown in FIG. 5. The method shown in FIG. 6 can be executed on a data processing system, such as data processing system 100 in FIG. 1 or data processing system 200 in FIG. 2. In an illustrative example, the method shown in FIG. 6 can be implemented using a just-in-time complier in a virtual machine.

The process begins as the optimizing complier clones the software method to be compiled (step 600). Thus, the optimizing compiler clones the software method being compiled such that the software method comprises at least a first software method clone and a second software method clone. This step is similar to the cloning step 500 in FIG. 5. Next, the optimizing compiler inserts profiling instrumentation into one of the clones (step 602). Again, this step is similar to corresponding step 502 in FIG. 5. Profiling instrumentation need not necessarily be inserted; however, only limited profiling data can be gathered in this case. Then, the optimizing compiler creates transitions between equivalent program points in the two clones (step 604). Again, this step is similar to corresponding step 504 in FIG. 5.

At this point, however, the process shown in FIG. 6 diverges from the process shown in FIG. 5. Nevertheless, similar terms used with respect to FIG. 6 have the same meanings as corresponding terms used with respect to FIG. 5.

After creating the transitions, the optimizing compiler inserts lock objects for each clone of the software method in order to perform synchronization operations (step 606). Thus, the optimizing compiler inserts a lock object into the first software method clone, the second software method clone, and any additional software method clones. A lock object is an object used to perform a synchronization operation as a result of which some storage within the object is updated to reflect the fact that a specific thread has succeeded in a synchronization operation. Examples of lock objects are shown within FIG. 9 and FIG. 10. In a multi-thread environment, each thread will synchronize on the lock object to ensure that manipulation of global data structures for a corresponding software method is performed by only one thread—the thread that has successfully acquired the lock. This step thereby eliminates race conditions that may arise without the presence of the lock objects.

In an illustrative example, the optimizing compiler inserts lock objects into each clone of the software method such that exactly two synchronization operations will be performed. By limiting the optimizing compiler to two synchronization operations, impact of the method on software method efficiency and scalability is limited. However, in other illustrative examples, the optimizing compiler can insert additional lock objects such that more than two synchronization operations will be performed or that only one synchronization operation will be performed.

Continuing with the illustrative method, the optimizing compiler changes the code controlling transitions between profiling and non-profiling clones to access thread-local storage (step 608). Thus, the optimizing compiler changes code that controls the at least one transition between a profiling clone and a non-profiling clone to access thread-local storage, wherein the profiling clone and the non-profiling clone each comprise at least one of the first software method clone, the second software method clone, and any additional software clones. The thread-local storage corresponds to the profiling count and profiling frequency instead of the global variables themselves. Accordingly, local_profiling_count and local_profiling_frequency are substituted for global_profiling_count and global_profiling_frequency, respectively.

The optimizing compiler then performs a first synchronization operation at an entry point of the software method being profiled (step 610). In particular, the optimizing compiler performs a first synchronization operation at an entry point of the profiling clone. Optionally, the first synchronization operation can be performed at any desired point in the profiling clone or at any desired point in another clone. The first synchronization operation is performed upon entry of the software method or profiling clone. The first synchronization operation synchronizes access to global data such that only one thread will operate on any given set of global data.

In the locked region of software method code, the value of the profiling frequency and the profiling count is read and stored in thread-local storage. Thread-local storage can be allocated in the Java virtual machine's internal representation for each user thread, or as a temporary on the stack. Thread-local storage is also allocated for each basic block to store the number of times a block is executed, and each thread-local block counter is initialized to zero. This block frequency initialization does not need to be performed in the locked region.

Continuing the illustrative method, after changing the code controlling transitions between software method clones, the optimizing compiler causes the software method clone being profiled using thread-local storage (step 612) to be executed. Thus, when a transition occurs between the profiling and the non-profiling software method clones, as described with respect to FIG. 5, the transition accesses thread-local storage instead of the global data. For this reason, during execution of the software method being profiled, the thread-local storage can be read and updated without any synchronization by each thread.

While the software method being profiled is executed, the optimizing compiler gathers profiling data (step 614). This step is similar to step 506 in FIG. 5. Optionally, additional synchronization operations can be performed while the optimizing compiler is profiling the software method clone (step 616). However, as stated above, usually only two synchronization operations are performed, one at software method entry and one at software method exit.

When the software method clone being profiled reaches an exit point, the optimizing compiler performs a second synchronization operation (step 618) using the lock objects inserted at the exit points at step 606. Thus, the optimizing compiler performs a second synchronization operation at an exit point of the profiling clone. The locked regions at the exit points in the software method clone being profiled read the values in the thread-local storage. Based on the values in the thread-local storage, the optimizing compiler updates the respective global data values that are to be updated. Each set of global data can be updated slightly differently, as shown in FIG. 10.

Upon exit from the software method clone being profiled, the optimizing compiler completes gathering of profile data (step 620). The optimizing compiler can use the gathered profile data to modify the original code of the software method, such as original code 400 in FIG. 4, in order to produce optimized code for the software method, such as optimized code 404 in FIG. 4 (step 622). Optionally, the gathered profile data can be presented to a user, sent to a file, or further manipulated as desired. The process terminates thereafter.

Thus, the process shown in FIG. 6 provides for a computer implemented method, apparatus, and computer usable program code for synchronizing a plurality of clones of a software method to be executed by at least one thread while the software method is compiled. An exemplary method includes cloning the software method to be compiled to generate a first software method clone. At least one transition is created between equivalent program points in the software method and the first software method clone. A lock object is inserted into one of the software method and the first software method clone. Code that controls the at least one transition between a profiling clone and a non-profiling clone is changed to access thread-local storage. The non-profiling clone comprises the one of the software method and the first software method clone into which the lock object was inserted, and the profiling clone comprises the other one of the software method and the software method clone. A first synchronization operation is performed at one of an entry point of the non-profiling clone and a point after the entry point of the non-profiling clone so as to initialize the thread-local storage prior to using the thread-local storage. The profiling clone is executed using thread-local storage.

The illustrative example described above can be expanded to cover the case of multiple clones operating in a dynamic compilation environment. For example, in the method described in the previous paragraph, the software method to be compiled can be cloned to generate at least a second software method clone. The second software method clone comprises one of a second non-profiling clone and a second profiling clone. At least one transition is created between equivalent program points in each profiling clone and each non-profiling clone. The second software method clone is executed using thread-local storage.

Figure 7:
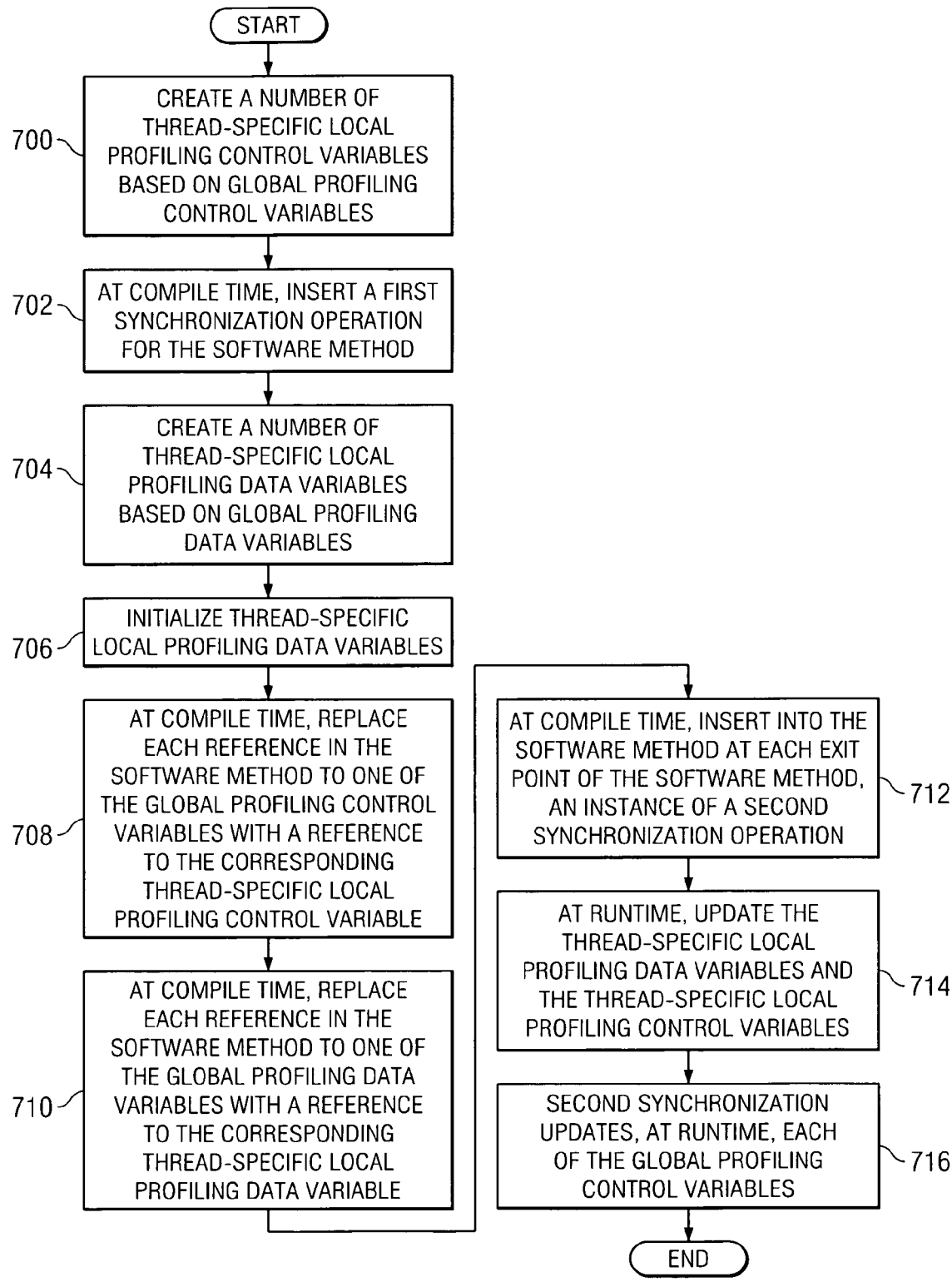
FIG. 7 is a flowchart illustrating profiling in a multi-threaded dynamic compilation environment, in accordance with an illustrative example of the present invention.

FIG. 7 is a flowchart illustrating profiling in a multi-threaded dynamic compilation environment, in accordance with an illustrative example of the present invention. The method shown in FIG. 7 is performed in an optimizing compiler, such as optimizing compiler 402 shown in FIG. 4. The method shown in FIG. 7 can be executed on a data processing system, such as data processing system 100 in FIG. 1 or data processing system 200 in FIG. 2. In an illustrative example, the method shown in FIG. 7 can be implemented in a just-in-time compiler a virtual machine. Furthermore, the method shown in FIG. 7 provides a detailed description of profiling during operation of an optimizing compiler on a software method to be optimized. The method shown in FIG. 7 describes a method for profiling, at runtime, computer-executable code for a software method expected to be executed by one or more threads, the software method having references to each of a plurality of global profiling control variables and to each of a plurality of global profiling data variables.

The process begins as the optimizing compiler creates a number of thread-specific local profiling control variables based on global profiling control variables (step 700). Thread-specific local profiling control variables are references to data accessed by only one thread that are used to control how frequently profiling code will be executed and for how long profiling will be performed by that thread when it is executing code. Global profiling control variables are references to global data that are used to control how frequently profiling code will be executed and for how long profiling will be performed. Thus, each thread expected to execute the software method has a number of thread-specific local profiling control variables which are based on a corresponding global profiling control variable.

Next, at compile time, the optimizing compiler inserts a first synchronization operation for the software method being profiled (step 702). The synchronization operation can be a lock object, as described with respect to FIG. 6, FIG. 8, and FIG. 9. When executed at runtime, the first synchronization operation acquires exclusive access to the global profiling control variables. The first synchronization operation then initializes each of the number of thread-specific local profiling control variables. Thereafter, the first synchronization operation releases exclusive access. Acquisition and release of exclusive access to global data can also be performed using known techniques, other than those described here.

The optimizing compiler then creates a number of thread-specific local profiling data variables based on the global profiling data variables (step 704). Each thread expected to execute the software method thereby has a number of thread-specific local profiling data variables. Each such thread-specific local profiling data variable is based on a corresponding global profiling data variable.

Then, the optimizing compiler causes the thread-specific local profiling data variables to be initialized (step 706). At compile time, the optimizing compiler replaces each reference in the software method to one of the global profiling control variables with a reference to the corresponding thread-specific local profiling control variable (step 708). Thus, each thread that executes the software method will have its own thread-specific local profiling control variables.

Next, the optimizing compiler replaces each reference in the software method to one of the global profiling data variables with a reference to the corresponding thread-specific local profiling data variable (step 710). Accordingly, each thread that executes the software method will have its own thread-specific local profiling data variable.

At compile time, the optimizing compiler inserts into the software method at each exit point of the software method an instance of a second synchronization operation (step 712). At runtime, the optimizing compiler updates the thread-specific local profiling data variables and the thread-specific local profiling control variables (step 714). The second synchronization operation updates, at runtime, each of the global profiling control variables (step 716). The second synchronization operation updates each global profiling control variable to reflect the value of its corresponding thread-specific local profiling control variable that is thread-specific to one of the threads that most recently executed the software method. The process terminates thereafter.

In an illustrative example, the method shown in FIG. 7 occurs in a specific order. For example, the thread-specific local profiling control variables can be created prior to initialization of the thread-specific local profiling control variables, the thread-specific local profiling data variables can be created prior to initialization of the thread-specific local profiling data variables, and the thread-specific local profiling data variables can be initialized prior to updating the thread-specific local profiling data variables.

Additionally, the local profiling data variables have a variety of uses, as the local profiling data variables contain the data that was to be gathered. The local profiling data variables contain data used for later analysis to drive optimization of the software method when the software method is recompiled. For example, the local profiling data variables can be combined with corresponding global profiling data variables at the exit point of the software method. In another example, the local profiling data variables are saved, or persisted, beyond the end of the method invocation because the local profiling data variables contain a summary of all the invocations of on a particular thread. In yet another example, the local profiling data variables are maintained separately as the data for a single invocation.

FIG. 8 is pseudo-code for which profiling in a multi-threaded dynamic compilation environment can be performed, in accordance with an illustrative example of the present invention. The pseudo-code shown in FIG. 8 can be profiled using the techniques shown with respect to FIG. 5. In conjunction with the pseudo-code shown in FIG. 9 and FIG.

10, the pseudo-code shown in FIG. 5 can be profiled efficiently in a multi-threaded dynamic compilation environment.

FIG. 8 shows two columns. In each column pseudo-code is shown. The pseudo-code in the right-hand column is a clone of the pseudo-code in the left hand column, and vice versa. Thus, FIG. 8 shows a profiling clone and a non-profiling clone in line 1.

For the pseudo-code shown in FIG. 8, the profiling approach is defined by the following process: First, every FREQ execution path in the non-profiling code (line 8 in the non-profiling clone) transitions to a corresponding command in the profiling code (line 5 of the profiling clone). An execution path is a control flow path in a program that starts from an entry point or a loop back edge and ends at an exit point or loop back edge. Second, one execution path is executed in the profiled code. Third, the process transitions to the non-profiling code. Fourth, the process repeats a number of times equal to the term COUNT (line 7 in the non-profiling clone). Thereafter, the profiling process terminates.

A problem that can occur when performing profiling on the pseudo-code shown in FIG. 8 in a multi-threaded environment is that recompilation may not occur for a long time. If multiple threads are executing the pseudo-code shown in FIG. 8 in a software method, and the profiling frequency is set to a large value, such as (MAX_INT-1), and the profiling count is not zero, then the profiling count will only decrease after MAX_INT execution paths have been executed. As a result, recompilation may not occur for a long time.

For example, three threads execute the pseudo-code shown in FIG. 8. Thread 1 sets the profiling count to 0 and profiling frequency to (MAX_INT). Thread 2 reads profiling frequency (MAX_INT) to execute profiling frequency. Thread 3 resets the profiling count and profiling frequency to their initial values. Thread 2 then writes the profiling frequency as (MAX_INT-1). Thus, without the techniques described with respect to FIG. 6, FIG. 7, FIG. 9, and FIG. 10, profiling the pseudo-code shown in FIG. 8 in a multi-threaded environment can result in seriously degraded performance of the program being executed.

FIG. 9 is pseudo-code representing a lock object inserted at an entry point in a software method, in accordance with an illustrative example of the present invention. The operation of lock objects are described in detail with respect to FIG. 6 and FIG. 7. The pseudo-code shown in FIG. 9 is inserted at each entry point in the software method clones. The code shown in FIG. 9 effectively changes the code that controls the transitions between the profiling and the non-profiling clones such that the optimizing compiler accesses thread-local storage corresponding to the profiling count and profiling frequency instead of to the global data.

FIG. 10 is pseudo-code representing a lock object inserted at an exit point in a software method, in accordance with an illustrative example of the present invention. The operation of lock objects are described in detail with respect to FIG. 6 and FIG. 7. The pseudo-code shown in FIG. 10 is inserted at each exit point out of the software method clones. The locked regions at the exit points read the values in the thread-local storage and update the respective global data that should be updated. As the pseudo-code of FIG. 10 shows, each global data set is updated slightly differently.

Control can exit from a software method due to return statements or due to exceptions being thrown and not caught in the software method being profiled. To account for every exit, the pseudo-code shown in FIG. 10 is added before every return in the software method. Additionally, the pseudo-code is also added to a compiler-generated catch block that can catch exceptions of any type. Once the profiling data structures have been synchronized, the caught exceptions are re-thrown so that the original software method behavior is maintained.

FIG. 11 is a table showing experimental results on the effect that efficient multi-threaded dynamic compilation techniques have on memory requirements and compilation speed. The results shown in FIG. 11 were experimentally obtained by performing the methods described with respect to FIG. 6 and FIG. 7. The experimental results shown in FIG. 7 are presented for illustrative purposes only. These results can change depending on the software methods used, the exact implementation of the methods described herein, and other factors.

The experimental results shown in FIG. 11 show the combined stack memory, measured at compile time, used by all the software methods that were compiled with profiling instrumentation on a Windows IA32 platform. The experimental data shown in FIG. 11 is presented only for benchmarks that have significant hot spots in a software method that are profiled. A hot spot is a region in a software method that is executed frequently. The Trade6 application does not have any methods which are deemed hot enough to perform profiling.

The stack usage, in terms of number of 4-byte slots, was measured for the profiled methods originally before and after creating local variables, on the stack, for each of the global variables used for profiling. The global variables were profiling count, profiling period, and basic block frequencies. The increase in stack usage was also measured if local variables were created for the profiling count and profiling frequency, excluding block frequencies.

From the tables shown in FIG. 11, it can be observed that the increase in stack usage is 14.7% on average, but stack usage can be as high as 42% for _228_jack. The larger growth for this particular benchmark is due to many small methods that are hot. These methods did not initially have large stack frames, so the percentage growth is larger than for other benchmarks with fewer or larger profiled methods.

The increase in stack needed for localizing the block frequencies is significantly higher, about 4 to 9 times the original stack usage, with an average of about 5.6 times higher in all cases. This increase is directly proportional to the number of basic blocks in the methods. Because the profiling process aggressively inlines into hot software methods, profiled software methods can have a large number of basic blocks. While the amount of extra memory needed appears high, when viewed in the context of the size of profiled method stack frames, the extra memory is not large in the aggregate.

If, instead of employing the stack, the memory could be allocated from the Java virtual machine's thread-local area, then across these benchmarks _213_javac would use the most additional memory at just 10 KB. Furthermore, significant reuse of the thread-local memory should be possible because the profiling code is expected to be in use only for a short duration till the method is recompiled. Additionally, privatizing the block frequencies has no advantage in producing correct results; privatizing only reduces imprecision in the collected profile data.

The time taken to profile the software method was also measured. This time was measured if global variables were used for profiling, if all the global variables were allocated as locals on the stack, and if only the profiling frequency and count were allocated as locals. The overhead involved both the lock operations, as well as the update to the global variables on software method exit and local variables on software method entry.

The results shown in FIG. 11 show that overhead is negligible in most benchmarks, and not very significant, around 10%, in the others. The sole exception is the _202_jess benchmark. The _202_jess benchmark contains many software methods that are profiled, and these software methods are not very complex. Thus, the profiling code increases the number of ticks in those methods appreciably. Nonetheless, the benchmarks' final execution time was not measurably affected by the overheads in the profiling methods. In particular, the results for the two multi-threaded benchmarks (_227_mtrt and SPECjbb2000) indicated that the synchronization proved to be relatively lightweight.

Thus, the synchronization operations described herein introduce a runtime overhead to the overall compilation process. However, the extra overhead cost is fixed for each invocation, as opposed to prior methods where the overhead can vary widely based on thread scheduling, which is usually random. Additionally, the extra overhead is relatively minimal, as proved by the results shown in FIG. 11. In the worst case, the additional overhead on runtime performance is predictable and very likely less than the runtime overhead used by prior methods of profiling in a multi-threaded environment.

The invention can take the form of an entirely software embodiment or an embodiment containing both hardware and software elements. For example, profile data can be gathered from hardware performance counters. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, the methods and devices described herein can be used to synchronize multiple profiling clones or multiple non-profiling clones. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for synchronizing a plurality of clones of a software method to be executed by at least one thread while the software method is compiled, the software method having references to each of a plurality of global profiling control variables and to each of a plurality of global profiling data variables, the computer-implemented method comprising:

cloning, by a processor, the software method to generate a first software method clone;

creating, by a processor, at least one transition between equivalent program points in the software method and the first software method clone;

inserting, by a processor, a lock object into one of the software method and the first software method clone;

changing, by a processor, code that controls the at least one transition between the equivalent program points in the software method and the first software method clone, wherein a non-profiling clone comprises the one of the software method and the first software method clone into which the lock object was inserted, and a profiling clone comprises the other one of the software method and the first software method clone;

causing creation, by a processor, of a plurality of thread-specific local profiling control variables based on the plurality of global profiling control variables, so that each thread expected to execute the software method has a plurality of thread-specific local profiling control variables, each such thread-specific local profiling control variable being based on a corresponding global profiling control variable;

performing, by a processor, a first synchronization operation at one of an entry point of the non-profiling clone and a point after the entry point of the non-profiling clone so as to initialize the thread-local storage prior to using the thread-local storage, wherein, when executed at runtime, the first synchronization operation acquires exclusive access to the plurality of global profiling control variables, initializes each of the plurality of thread-specific local profiling control variables, and then releases exclusive access; and executing, by a processor, the profiling clone using thread-local storage.

2. The computer-implemented method of claim 1 further comprising:

performing, by a processor, a second synchronization operation at an exit point of the non-profiling clone.

3. The computer-implemented method of claim 2 further comprising:

performing, by a processor, at least one additional synchronization operation after performing the first synchronization operation and the second synchronization operation.

4. The computer-implemented method of claim 2 further comprising:
   inserting, by a processor, profiling instrumentation into the profiling clone; and
   gathering, by a processor, profiling data before performing the step of performing the second synchronization operation.

5. The computer-implemented method of claim 4 further comprising:
   using, by a processor, the profiling data to optimize the software method.

6. The computer-implemented method of claim 4 further comprising:
   gathering, by a processor, additional profiling data after the step of performing the second synchronization operation; and
   using, by a processor, the profiling data and the additional profiling data to optimize the software method.

7. The computer-implemented method of claim 1 further comprising:
   cloning, by a processor, the software method to be compiled to generate at least a second software method clone, wherein the second software method clone comprises one of a second non-profiling clone and a second profiling clone;
   creating, by a processor, at least one transition between equivalent program points in each profiling clone and each non-profiling clone; and
   executing, by a processor, the second software method clone using thread-local storage.

8. A tangible computer storage medium having a computer program product encoded thereon for synchronizing a plurality of clones of a software method to be executed by at least one thread while the software method is compiled, the software method having references to each of a plurality of global profiling control variables and to each of a plurality of global profiling data variables, the computer program product comprising:
   computer usable program code for cloning the software method to generate a first software method clone;
   computer usable program code for creating at least one transition between equivalent program points in the software method and the first software method clone;
   computer usable program code for inserting a lock object into one of the software method and the first software method clone;
   computer usable program code for changing code that controls the at least one transition between the equivalent program points in the software method and the first software method clone, wherein a non-profiling clone comprises the one of the software method and the first software method clone into which the lock object was inserted, and a profiling clone comprises the other one of the software method and the first software method clone;
   computer usable program code for causing creation of a plurality of thread-specific local profiling control variables based on the plurality of global profiling control variables, so that each thread expected to execute the software method has a plurality of thread-specific local profiling control variables, each such thread-specific local profiling control variable being based on a corresponding global profiling control variable;
   computer usable program code for performing a first synchronization operation at one of an entry point of the non-profiling clone and a point after the entry point of the non-profiling clone so as to initialize the thread-local storage prior to using the thread-local storage, wherein, when executed at runtime, the first synchronization operation acquires exclusive access to the plurality of global profiling control variables, initializes each of the plurality of thread-specific local profiling control variables, and then releases exclusive access; and
   computer usable program code for executing the profiling clone using thread-local storage.

9. The tangible computer storage medium of claim 8, the computer program product further comprising:
   computer usable program code for performing a second synchronization operation at an exit point of the non-profiling clone.

10. The tangible computer storage medium of claim 9, the computer program product further comprising:
    computer usable program code for performing at least one additional synchronization operation after performing the first synchronization operation and the second synchronization operation.

11. The tangible computer storage medium of claim 9, the computer program product further comprising:
    computer usable program code for inserting profiling instrumentation into the profiling clone; and
    computer usable program code for gathering profiling data before performing the step of performing the second synchronization operation.

12. The tangible computer storage medium of claim 11, the computer program product further comprising:
    computer usable program code for using the profiling data to optimize the software method.

13. The tangible computer storage medium of claim 11, the computer program product further comprising:
    computer usable program code for gathering additional profiling data after the step of performing the second synchronization operation; and
    computer usable program code for using the profiling data and the additional profiling data to optimize the software method.

14. The tangible computer storage medium of claim 8, the computer program product further comprising:
    computer usable program code for cloning the software method to be compiled to generate at least a second software method clone, wherein the second software method clone comprises one of a second non-profiling clone and a second profiling clone;
    computer usable program code for creating at least one transition between equivalent program points in each profiling clone and each non-profiling clone; and
    computer usable program code for executing the second software method clone using thread-local storage.

15. A data processing system comprising:
    a processor;
    a bus connected to the processor;
    a computer usable medium coupled to the bus, wherein the computer usable medium contains a set of instructions for synchronizing a plurality of clones of a software method to be executed by at least one thread while the software method is compiled, the software method having references to each of a plurality of global profiling control variables and to each of a plurality of global profiling data variables, wherein the processor is adapted to carry out the set of instructions to:
    clone the software method to generate a first software method clone;
    create at least one transition between equivalent program points in the software method and the first software method clone;

insert a lock object into one of the software method and the first software method clone;

change code that controls the at least one transition between the equivalent program points in the software method and the first software method clone, wherein a non-profiling clone comprises the one of the software method and the first software method clone into which the lock object was inserted, and a profiling clone comprises the other one of the software method and the first software method clone;

cause a creation of a plurality of thread-specific local profiling control variables based on the plurality of global profiling control variables, so that each thread expected to execute the software method has a plurality of thread-specific local profiling control variables, each such thread-specific local profiling control variable being based on a corresponding global profiling control variable;

perform a first synchronization operation at one of an entry point of the non-profiling clone and a point after the entry point of the non-profiling clone so as to initialize the thread-local storage prior to using the thread-local storage, wherein, when executed at runtime, the first synchronization operation acquires exclusive access to the plurality of global profiling control variables, initializes each of the plurality of thread-specific local profiling control variables, and then releases exclusive access; and execute the profiling clone using thread-local storage.

16. The data processing system of claim 15 wherein the processor is further adapted to carry out the set of instructions to:

perform a second synchronization operation at an exit point of the non-profiling clone.

17. The data processing system of claim 16 wherein the processor is further adapted to carry out the set of instructions to:

perform at least one additional synchronization operation after performing the first synchronization operation and the second synchronization operation.

18. The data processing system of claim 16 wherein the processor is further adapted to carry out the set of instructions to:

insert profiling instrumentation into the profiling clone; and gather profiling data before performing the step of performing the second synchronization operation.

19. The data processing system of claim 18 wherein the processor is further adapted to carry out the set of instructions to:

use the profiling data to optimize the software method.

20. The data processing system of claim 18 wherein the processor is further adapted to carry out the set of instructions to:

gather additional profiling data after the step of performing the second synchronization operation; and use the profiling data and the additional profiling data to optimize the software method.

21. The data processing system of claim 15 wherein the processor is further adapted to carry out the set of instructions to:

clone the software method to be compiled to generate at least a second software method clone, wherein the second software method clone comprises one of a second non-profiling clone and a second profiling clone;

create at least one transition between equivalent program points in each profiling clone and each non-profiling clone; and execute the second software method clone using thread-local storage.

22. A method for profiling, at runtime, computer-executable code for a software method expected to be executed by one or more threads, the software method having references to each of a plurality of global profiling control variables and to each of a plurality of global profiling data variables, the method comprising the computer-implemented steps of:

causing creation, by a processor, of a plurality of thread-specific local profiling control variables based on the plurality of global profiling control variables, so that each thread expected to execute the software method has a plurality of thread-specific local profiling control variables, each such thread-specific local profiling control variable being based on a corresponding global profiling control variable;

at compile time, inserting, by a processor, a first synchronization operation into the software method, wherein, when executed at runtime, the first synchronization operation acquires exclusive access to the plurality of global profiling control variables, initializes each of the plurality of thread-specific local profiling control variables, and then releases exclusive access;

causing creation, by a processor, of a plurality of thread-specific local profiling data variables based on the plurality of global profiling data variables, so that each thread expected to execute the software method has a plurality of thread-specific local profiling data variables, each such thread-specific local profiling data variable being based on a corresponding global profiling data variable;

causing initialization, by a processor, of the plurality of thread-specific local profiling data variables;

at compile time, replacing, by a processor, each reference in the software method to one of the plurality of global profiling control variables with a reference to the corresponding thread-specific local profiling control variable so that each thread that executes the software method will have its own thread-specific local profiling control variables;

at compile time, replacing, by a processor, each reference in the software method to one of the plurality of global profiling data variables in the software method with a reference to the corresponding thread-specific local profiling data variable so that each thread that executes the software method will have its own thread-specific local profiling data variables;

at runtime, updating, by a processor, the plurality of thread-specific local profiling data variables and the plurality of thread-specific local profiling control variables; and at compile time, inserting, by a processor, into the software method, at each exit point of the software method, an instance of a second synchronization operation, wherein the second synchronization operation updates, at runtime, each of the plurality of global profiling control variables to reflect a value of its corresponding thread-specific local profiling control variable that is thread-specific to one of the one or more threads that most recently executed the method;

wherein the plurality of thread-specific local profiling control variables are created prior to initialization of the plurality of thread-specific local profiling control variables, the plurality of thread-specific local profiling data variables are created prior to initialization of the plurality of thread-specific local profiling data variables, and the plurality of thread-specific local profiling data variables are initialized prior to updating the thread-specific local profiling data variables.

23. The method of claim 22 wherein the step of causing creation of a plurality of thread-specific local profiling control variables is performed at a time selected from one of compile time or runtime.

24. The method of claim 22 wherein the step of causing creation of a plurality of thread-specific local profiling data variables is performed at a time selected from one of compile time or runtime.

25. The method of claim 22 wherein the step of causing initialization of the thread-specific local profiling data variables is performed at a time selected from one of compile time or runtime.

26. The method of claim 22 further comprising:
combining, by a processor, the plurality thread-specific local profiling data variables with corresponding global profiling data variables.

27. The method of claim 22 further comprising:
saving, by a processor, the plurality of local profiling data variables after invocation of the software method, wherein the plurality of local profiling data variables contain a summary of all invocations on a particular thread.

28. The method of claim 22 wherein the plurality of local profiling data variables are maintained separately as the data for a single invocation.

29. The method of claim 22 wherein the method is performed in an optimizing compiler and the optimizing compiler operates on a profiling clone of the software method, and wherein the method further comprises:
transitioning, by a processor, at compile time, from the software method to the profiling clone of the software method based on the thread-specific local profiling control variables instead of using the global profiling control variables.

* * * * *